(12) United States Patent
Sergeev

(10) Patent No.: US 12,305,117 B2
(45) Date of Patent: May 20, 2025

(54) METHOD FOR LEVELING THE INJECTIVITY PROFILE OF AN INJECTION WELL

(71) Applicant: LIMITED LIABILITY COMPANY OILMIND, Moscow (RU)

(72) Inventor: Vitalii Vyacheslavovich Sergeev, Moscow (RU)

(73) Assignee: LIMITED LIABILITY COMPANY OILMIND, Moscow (RU)

( * ) Notice: Subject to any disclaimer, the term of this patent is extended or adjusted under 35 U.S.C. 154(b) by 0 days.

(21) Appl. No.: 17/906,931

(22) PCT Filed: Feb. 26, 2021

(86) PCT No.: PCT/RU2021/050050
§ 371 (c)(1),
(2) Date: Sep. 21, 2022

(87) PCT Pub. No.: WO2021/194390
PCT Pub. Date: Sep. 30, 2021

(65) Prior Publication Data
US 2023/0126946 A1 Apr. 27, 2023

(30) Foreign Application Priority Data
Mar. 25, 2020 (RU) .......................... RU2020112178

(51) Int. Cl.
*C09K 8/50* (2006.01)
*C09K 23/34* (2022.01)
(Continued)

(52) U.S. Cl.
CPC ............... *C09K 8/50* (2013.01); *C09K 23/34* (2022.01); *E21B 33/138* (2013.01); *E21B 43/32* (2013.01); *B82Y 30/00* (2013.01)

(58) Field of Classification Search
CPC .......... C09K 8/50; C09K 8/502; C09K 8/504; C09K 8/506; C09K 8/5045; C09K 8/516;
(Continued)

(56) References Cited

U.S. PATENT DOCUMENTS 3,060,210 A * 10/1962 De Groote .............. C23F 11/14
507/131
3,956,145 A * 5/1976 Christopher, Jr. ...... E21B 43/20
507/224
(Continued)

FOREIGN PATENT DOCUMENTS

CN 104673260 A 6/2015
CN 108048057 A 5/2018
(Continued)

OTHER PUBLICATIONS

Translation of WO-2019039974-A1 (Year: 2019).*
(Continued)

*Primary Examiner* — Angela M DiTrani Leff
(74) *Attorney, Agent, or Firm* — Perilla Knox & Hildebrandt LLP; Stephanie Davy-Jow

(57) ABSTRACT

A method for leveling the injectivity profile of an injection well involves pumping into the bottom-hole formation zone a blocking agent in the form of an emulsion system containing nanoparticles of silicon dioxide and being comprised of: 5-12 vol % diesel fuel, 2-3 vol % emulsifier, 0.25-1.0 vol % colloidal nanoparticles of silicon dioxide, with the remainder being an aqueous solution of calcium chloride or potassium chloride. The emulsifier is in the form of a composition comprising: 40-42 vol % esters of linoleic or oleic acids and resin acids, 0.7-1 vol % amine oxide, 0.5-1 vol % suspension of lime in diesel fuel or suspension of bentonite in diesel fuel, with the remainder being diesel fuel.

6 Claims, 2 Drawing Sheets

| ESN sample No. | ESN composition, vol.% | | Emulsifier | Colloidal nanoparticles | Aqueous solution of salts | Separated water amount vol.% |
|---|---|---|---|---|---|---|
| | Hydrocarbons | | | | | |
| | Diesel fuel | Oil | | | | |
| 1 | 5 | - | 3.0 | 1.0 | 91.0 | 0 |
| 2 | 6 | - | 3.0 | 0.9 | 90.1 | 0 |
| 3 | 8 | - | 2.5 | 0.7 | 88.8 | 1 |
| 4 | 10 | - | 2.3 | 0.5 | 87.2 | 2 |
| 5 | 12 | - | 2.0 | 0.25 | 83.0 | 1 |
| 6 | - | 12 | 2.0 | 0.25 | 83.0 | 2 |
| 7 | - | 10 | 2.3 | 0.5 | 87.2 | 1 |
| 8 | - | 8 | 2.5 | 0.7 | 88.8 | 0 |
| 9 | - | 6 | 3.0 | 0.9 | 90.1 | 0 |
| 10 | - | 5 | 3.0 | 1.0 | 91.0 | 0 |

(51) Int. Cl.
*E21B 33/138* (2006.01)
*E21B 43/32* (2006.01)
*B82Y 30/00* (2011.01)

(58) Field of Classification Search
CPC ....... C09K 23/34; E21B 33/13; E21B 33/138; E21B 43/32
See application file for complete search history.

(56) References Cited

U.S. PATENT DOCUMENTS

| | | | | |
|---|---|---|---|---|
| 6,068,054 | A * | 5/2000 | Bragg | C09K 8/502 |
| | | | | 507/904 |
| 11,008,499 | B2 * | 5/2021 | Sergeev | C09K 8/5045 |
| 11,248,161 | B2 * | 2/2022 | Sergeev | C09K 8/72 |
| 11,261,718 | B2 * | 3/2022 | Sergeev | E21B 3/16 |
| 11,414,953 | B2 * | 8/2022 | Sergeev | C04B 28/24 |
| 11,620,023 | B1 * | 4/2023 | He | G06F 3/044 |
| | | | | 345/173 |
| 2009/0211758 | A1 | 8/2009 | Bragg et al. | |
| 2010/0224366 | A1 * | 9/2010 | Lende | C04B 28/02 |
| | | | | 166/292 |
| 2014/0116695 | A1 * | 5/2014 | Maghrabi | C09K 8/36 |
| | | | | 166/279 |
| 2014/0158354 | A1 * | 6/2014 | Kumar | C04B 28/14 |
| | | | | 166/292 |
| 2016/0017204 | A1 * | 1/2016 | Hill | C09K 8/74 |
| | | | | 166/305.1 |

FOREIGN PATENT DOCUMENTS

| | | |
|---|---|---|
| RU | 2110675 C1 | 6/1998 |
| RU | 2254459 C1 | 6/2005 |
| RU | 2263773 C1 | 11/2005 |
| RU | 2279463 C2 | 7/2006 |
| RU | 2313558 C1 | 12/2007 |
| RU | 2539484 C1 | 1/2015 |
| RU | 2670307 C1 | 10/2018 |
| RU | 2700851 C1 | 9/2019 |
| WO | WO-2019039974 A1 * | 2/2019 ............ C04B 28/24 |

OTHER PUBLICATIONS

International Search Report for International Application No. PCT/RU2021/050050 mailed Sep. 30, 2021.
Written Opinion for International Application No. PCT/RU2021/050050 mailed Sep. 30, 2021.

* cited by examiner

| No. | Special machinery and equipment | Unit | Q-ty, pcs. | Purpose |
|---|---|---|---|---|
| 1 | Process tank with blade mixer and outer pump | pc. | 1 | Preparation of the ESN |
| 2 | Line (pipes, hoses) | set | 2 | Feeding and discharge of process liquids |
| 3 | Pumping unit | pc. | 1 | Pumping and injecting process liquids into well |
| 4 | Tank truck | pc. | 2 | Transportation of process liquids |
| 5 | Process tank | pc. | 2 | Storage of process liquids at well |
| 6 | Measuring bar | pc. | 1 | Measuring process liquid volumes |
| 7 | Areometer | pc. | 1 | Measuring solution densities |

Fig. 1

| ESN sample No. | ESN composition, vol.% | | | | Aqueous solution of salts | Density, kg/m$^3$ |
|---|---|---|---|---|---|---|
| | Hydrocarbons | | Emulsifier | Colloidal nanoparticles | | |
| | Diesel fuel | Oil | | | | |
| 1 | 5 | - | 3.0 | 1.0 | 91.0 | 1175 |
| 2 | 6 | - | 3.0 | 0.9 | 90.1 | 1171 |
| 3 | 8 | - | 2.5 | 0.7 | 88.8 | 1168 |
| 4 | 10 | - | 2.3 | 0.5 | 87.2 | 1163 |
| 5 | 12 | - | 2.0 | 0.25 | 83.0 | 1160 |
| 6 | - | 12 | 2.0 | 0.25 | 83.0 | 1162 |
| 7 | - | 10 | 2.3 | 0.5 | 87.2 | 1170 |
| 8 | - | 8 | 2.5 | 0.7 | 88.8 | 1175 |
| 9 | - | 6 | 3.0 | 0.9 | 90.1 | 1179 |
| 10 | - | 5 | 3.0 | 1.0 | 91.0 | 1181 |

Fig. 2

| ESN sample No. | ESN composition, vol.% | | | | Aqueous solution of salts | Separated water amount vol.% |
|---|---|---|---|---|---|---|
| | Hydrocarbons | | Emulsifier | Colloidal nanoparticles | | |
| | Diesel fuel | Oil | | | | |
| 1 | 5 | - | 3.0 | 1.0 | 91.0 | 0 |
| 2 | 6 | - | 3.0 | 0.9 | 90.1 | 0 |
| 3 | 8 | - | 2.5 | 0.7 | 88.8 | 1 |
| 4 | 10 | - | 2.3 | 0.5 | 87.2 | 2 |
| 5 | 12 | - | 2.0 | 0.25 | 83.0 | 1 |
| 6 | - | 12 | 2.0 | 0.25 | 83.0 | 2 |
| 7 | - | 10 | 2.3 | 0.5 | 87.2 | 1 |
| 8 | - | 8 | 2.5 | 0.7 | 88.8 | 0 |
| 9 | - | 6 | 3.0 | 0.9 | 90.1 | 0 |
| 10 | - | 5 | 3.0 | 1.0 | 91.0 | 0 |

Fig. 3

| Shear rate, $s^{-1}$ | Sample #7 | | | | Sample #8 | | | | Sample #10 | | | |
|---|---|---|---|---|---|---|---|---|---|---|---|---|
| | Shear stress, Pa | | Dynamic viscosity, mPa·s | | Shear stress, Pa | | Dynamic viscosity, mPa·s | | Shear stress, Pa | | Dynamic viscosity, mPa·s | |
| | Forward meas | Reverse meas | Forward meas | Reverse meas | Forward meas | Reverse meas | Forward meas | Reverse meas | Forward meas | Reverse meas | Forward meas | Reverse meas |
| 1.0 | 25.20 | 25.00 | 27,055.0 | 26,980.3 | 17.40 | 16.70 | 19,400.5 | 19,100.8 | 40.67 | 39.60 | 28,100.0 | 27,992.3 |
| 10.0 | 110.42 | 100.90 | 13,150.7 | 12,994.9 | 65.10 | 55.27 | 8,217.20 | 8,001.66 | 151.20 | 142.30 | 16,220.6 | 16,037.0 |
| 120.0 | 195.30 | 180.20 | 1,778.3 | 1,760.0 | 155.10 | 139.20 | 1,010.00 | 992.50 | 199.10 | 200.70 | 2,390.40 | 2,280.0 |
| 700.0 | 320.60 | 313.60 | 498.6 | 501.6 | 284.55 | 271.70 | 362.35 | 368.90 | 674.50 | 660.90 | 611.40 | 610.90 |
| 1300.0 | 416.80 | 408.19 | 400.5 | 399.2 | 296.80 | 288.00 | 295.90 | 297.10 | 690.10 | 620.50 | 604.20 | 600.50 |

Fig. 4

| Test time, s | Effective (apparent) viscosity, mPa·s, at 20.0°C and shear rate 450.0 $s^{-1}$ | | |
|---|---|---|---|
| | Sample #7 | Sample #8 | Sample #10 |
| 0 | 901.6 | 520.0 | 979.0 |
| 60 | 899.3 | 515.4 | 978.2 |
| 120 | 890.6 | 510.4 | 980.0 |
| 180 | 885.7 | 505.7 | 983.5 |
| 240 | 871.0 | 497.8 | 980.5 |
| 300 | 858.0 | 490.6 | 979.7 |
| 360 | 850.9 | 488.3 | 977.1 |
| 420 | 855.3 | 493.5 | 975.0 |
| 480 | 859.0 | 495.0 | 978.0 |
| 540 | 860.0 | 499.5 | 980.5 |
| 600 | 858.5 | 502.0 | 982.4 |

Fig. 5

METHOD FOR LEVELING THE INJECTIVITY PROFILE OF AN INJECTION WELL

CROSS-REFERENCE TO RELATED APPLICATIONS

This application is a national phase application under 35 U.S.C. § 371 of International Patent Application No. PCT/RU2021/050050 filed Feb. 26, 2021 entitled, "METHOD FOR LEVELING THE INJECTIVITY PROFILE OF AN INJECTION WELL," which claims the benefit of and priority to Russian Federation Patent Application No. 2020112178 filed Mar. 25, 2020, the contents of both of which being incorporated by reference in their entireties herein.

TECHNICAL FIELD

The present disclosure relates to the oil and gas production industry and, in particular, to technologies of redistributing filtration flows in the bottom-hole formation zone of an injection well.

BACKGROUND

A liquid and gas flow from a reservoir into wells under the action of forces which nature and magnitude are determined by a deposit operation mode. At present, one of the most common operation mode of oil and gas reservoirs is the water-pressure mode that is formed either in the presence of active edge water or after artificial water flooding of a reservoir.

The artificial water flooding of a reservoir can be implemented by injecting water from a surface to the reservoir through a network of injection wells provided for in a deposit development system at the stage of preparing a field for commercial operation. In this mode of reservoir operation, oil and gas are displaced from rocks by the external agent—injected water.

When liquids and gases are filtered in reservoir conditions, energy reserves are spent mainly for overcoming forces of viscous friction, capillary forces and adhesive forces. Here, hydraulic resistance, when liquids and gases are filtered in rocks, is proportional to a liquid flow rate and viscosity that are greatly influences by surface phenomena.

Formation fluids and water injected from the surface are filtered simultaneously in reservoir conditions. Oil is not fully displaced by the replacing agent due to different sizes of filtration channels and a difference in viscosities of oil and water. The latter, being less viscous liquid, passes ahead of oil, changing saturation of filtration channels and effective permeability of rocks for oil and water. Experiences show that an increase in water saturation up to 50-60% entails a progressing growth of a water amount in a flow due to a rise in effective permeability of rocks for water.

This phenomenon in combination with macro and micro heterogeneity of a reservoir leads to a discontinuity in an oil-by-water displacement front and formation of zones where injected water breaks through to lower pressure regions—bottomholes of producing wells. The presence of zones where the injected agent breaks through to bottomholes of producing wells leads to a reduction in the factor of reservoir coverage by the impact and the reservoir oil recovery factor.

In this connection, in order to solve the task of increasing efficiency of well operation when developing oil and gas fields, it is necessary to implement methods enabling to redistribute filtration flows in a bottomhole formation zone of an injection well and increase reservoir coverage by the impact.

An emulsion composition for limiting water inflow, leveling injectivity profile and killing wells is known in the art (Patent RU2539484, IPC C09K 8/42, C09K 8/506; publ. on 20 Jan. 2013). The emulsion composition comprises, in wt %:hydrocarbon phase—2-25, emulsifier—0.1-5.0, aqueous phase—the rest. The emulsifier comprises, as the active substance, an interaction product of a fatty acid of R—COOH type, where $R=C_5-C_{20}$, with amine R—N—$(R'—NH_2)_n$, where $R=C_4-C_{22}$, $R'=C_2-C_4$, n=0-2, at the following ratio of the emulsifier components, wt %:said interaction product 2.0-80.0, non-ionic surfactants (NIS) 2.0-60.0, alcohol—the rest. The composition may comprise oil, kerosene, or diesel fuel as the hydrocarbon phase. The composition may comprise saline or fresh water as the aqueous phase. A disadvantage of this emulsion composition is its relatively low thermal stability—80° C., which limits the composition applicability significantly.

Patent RU2279463 (IPC C09K 8/588, publ. on 10 Jul. 2006) discloses a composition for leveling injectivity profile of injection wells, reducing watering and increasing oil recovery, and a method for preparing it. The composition comprises an aqueous solution of exopolysaccharide produced by Azotobacter vinelondii (Lipman) FCh-1, VKPM V-5933 in the form of a culture liquid, starch and water, and further comprises a water absorbing polymer incorporated into an inert carrier, namely into an anhydrous hydrocarbon solvent used as a buffer to separate water when the composition is injected into a well. The composition may further contain a finely dispersed hydrophobic material in an amount from 0.1 to 2.0 wt %. The component ratio is, wt %:exopolysaccharide—0.005-0.10, starch—0.5-5.0, water absorbing polymer—0.1-5.0, water—the rest. As the inert carrier, anhydrous hydrocarbon liquids are used—kerosene, gasoline, nefras, diesel fuel, dioxane, diisopropyl ether, as well as alcohols, including glycols (ethylene glycol, diethylene glycol, polyglycols or waste containing them), glycerin or waste containing it, and other hydrocarbon fluids. As the finely dispersed hydrophobic material, finely dispersed materials of silicon oxides are used, e.g., PolySil® silica. As PolySil, chemically modified silicas ($SiO_2$) are used, and, depending on a modification method, hydrophobic PolySil-P1 and diphilic PolySil-DF are used. A disadvantage of this disclosure is its multicomponent composition and the necessity of using a buffer pack for reducing the risk of the water absorbing polymer gelation in the course of its injection into a well, which significantly complicates the implementation of the method in the conditions of the oil and gas production. The blocking effect of this composition is irreversible and uncontrollable, which is also a significant disadvantage of this method.

Patent RU2110675 (IPC E21B 43/22, publ. on 10 May 1998) discloses an invert microemulsion for treating oil reservoirs. The invert microemulsion comprises the following components, wt %:liquid hydrocarbon 10.0-20.0, emulsifier—Neftenol NZ 0.3-0.5%; calcium chloride 0.3-1.5; water—the rest. As the liquid hydrocarbon, a hexane fraction, stable gasoline, gas condensate, diesel fuel, and low-viscosity oils are used. The emulsifier Neftenol NZ is a hydrocarbon solution of acid esters of tall oil and triethanolamine. The microemulsion is used as follows. In the flooded reservoir, after applying the method of development by water injection, a calculated amount of the prepared microemulsion or an amount, at which the well injectivity is lowered to a preset mark, is injected through the buffer valve of the injection well. After the microemulsion is injected, water or an aqueous polymer solution is injected into the reservoir. A disadvantage of this disclosure includes the low mechanical and thermal stability of the invert microemulsion, which significantly limits the applicability of the composition.

Patent RU2313558 (IPC C09K 8/44, C09K 8/82, publ. on 27 Dec. 2007) discloses a composition for leveling an injectivity profile of injection wells and selective water isolation in production wells. The composition, which is a stable emulsion, comprises emulsifier Neftenol NZ, oil, 1.4-1.5% aqueous solution of sodium chloride and, additionally, bentonite and polyacrylamide with the following ratio of components, wt %:bentonite—0.95-1.0, polyacrylamide—0.45-0.5, Neftenol NZ—0.05-0.35, oil and sodium chloride solution at the weight ratio of 1:1—the rest. A disadvantage of this disclosure includes the irreversibility of the blocking effect due to the presence of polyacrylamide in the emulsion, as well as low thermal stability.

Patent CN108048057 (IPC C04B 28/00, C04B 28/26, C09K 8/467, C09K 8/58, E21B 43/22, publ. on 18 May 2018) discloses a composition (agent) and a method for controlling an injectivity profile. The agent comprises a first system and a second system. The first system is prepared from the following components, wt %:smectite—10-20, pulverized fuel ash—10-25, silicon dioxide—5-15, a modifying agent—0.2-0.8, a hardening agent—0.4-1, an activating agent—0.8-2, water—the rest. The second system is prepared from the following components, wt %: calcium chloride or magnesium chloride—15-25, sodium silicate—10-25, slag powder—5-15, sodium silicofluoride—3-10, water—the rest. The method for controlling profile comprises the following steps: injecting the first system into the reservoir; then, respectively, injecting an aqueous solution of calcium chloride or magnesium chloride and a mixed solution of sodium silicate, slag powder and water into the reservoir, and completing the profile control. The profile control agent of this disclosure is capable of blocking large pores, adjusting the steam injection profile, and increasing efficiency of steam displacement after reaction in an underground reservoir; thus, the objects of improving steam injection effect and increasing efficiency of oil recovery are achieved. A disadvantage of this disclosure is the multicomponent composition and high sensitivity to salinity and composition of process water and formation water, which significantly complicates the implementation of the method in the conditions of oil and gas production. The content of hardening and activating agents of the composition results in irreversible blockage of filtration channels in reservoir conditions and, consequently, in pollution of the environment.

Patent CN104673260 (IPC B02C 18/10, B02C 18/14, B02C 21/00, B07B 1/04, B07B 1/46, C09K 8/512, E21B 33/13, E21B 43/22, publ. on 3 Jun. 2015) discloses a cross-linking water shutoff and profile control agent, a method for producing it, and use thereof. The agent is prepared from micellar particles, a cross-linking agent, an initiator, and water. It comprises 4-9% of crude oil, 7.5-9% of HPAM, 0.4-0.5% of $CaCO_3$, 0.4-0.6% of MgCCE, 0.9-1.1% of $EerO_3$, 3.1-3.2% of silicate, and water—the rest. The agent is capable of shutting off water (blocking of water) and controlling a profile. In accordance with the disclosure, pollution of the environment is reduced, the process is simple, the treatment is fast, blockage during re-injection is prevented, and the agent is produced at a relatively low cost. A disadvantage of this disclosure is high sensitivity of the agent components to salinity and composition of process water and formation water, which significantly complicates the implementation of the method in the conditions of oil and gas production. The content of synthetic polymers of the agent composition results in irreversible blockage of filtration channels in reservoir conditions and, consequently, to pollution of the environment.

BRIEF SUMMARY

To solve the aforementioned problems in the development of oil and gas fields, a method is proposed for leveling the injectivity profile of an injection well, based on the injection of an emulsion system with nanoparticles of silicon dioxide into the bottom-hole formation zone (BFZ).

A method is described that comprises injecting a blocking agent into the bottom-hole formation zone, which is used as an emulsion system with nanoparticles of silicon dioxide (ESN), comprising (vol. %): diesel fuel or processed oil from an oil processing and pumping station—5-12, emulsifier—2-3, colloidal nanoparticles of silicon dioxide—0.25-1.0, an aqueous solution of calcium chloride or potassium chloride—the rest; wherein, the emulsifier is in the form of a composition that comprises (vol. %): esters of higher unsaturated fatty acids and resin acids—40-42, amine oxide—0.7-1, high-molecular-weight organic thermostabilizer—0.5-1, diesel fuel—the rest; the colloidal nanoparticles of silicon dioxide are in the form of a composition that comprises (vol. %): silicon dioxide—30-32 in propylene glycol monomethyl esters—67-68, water—the rest, or silicon dioxide—29-31 in isopropanol—67-69 and methyl alcohol—the rest, or silicon dioxide—29-31 in ethylene glycol—the rest.

The technical effect of the present disclosure is increased technological efficiency of well operation, expansion of applicability of the composition in oil and gas reservoirs, simplification of implementation of the method in an oil and gas production field, and reduction of harmful impact on the environment.

The composition applicability can be expanded through an increase in mechanical and thermal stability of the emulsion system. The implementation of the method in the conditions of an oil and gas production field can be simplified through a decrease in the number of components in the composition, due to elimination of the necessity of using a buffer pack for reducing the risk of gelation of the water absorbing polymer in the course of injecting the composition into a well, and through reducing the agent component sensitivity to salinity and composition of process water and formation water. Harmful impact on the environment is reduced through reversibility of the blocking effect of the proposed composition.

BRIEF DESCRIPTION OF THE DRAWINGS

The disclosure is illustrated by the following drawings.

FIG. 1 shows a table listing the equipment for the preparation and injection of ESN into an injection well.

FIG. 2 shows a table illustrating the results of measurements of the ESN density (the density of the water component is 1200 $kg/m^3$).

FIG. 3 shows a table illustrating the measurement results of the ESN thermal stability at 140° C.

FIG. 4 is a table illustrating the measurement results of the ESN dynamic viscosity.

FIG. 5 shows a table illustrating dependence of the ESN effective viscosity on test time (dynamic stability) at the temperature of 20.0° C. and the shear rate of 450.0 $s^{-1}$.

DETAILED DESCRIPTION

The method is based on the directional impact of the ESN on most permeable intervals of the BFZ of an injection well. The method provides redistribution of filtration flows in the BFZ and the involvement of less permeable stagnant zones of the reservoir into filtration processes. The unique physical properties of the ESN enable to effectively apply the method in reservoirs with abnormal temperatures, as well as to adjust physical properties of a reversible blocking agent, depending on reservoir conditions and well operation modes by changing a volume ratio of the constituent phases.

The main unique physical properties of the ESN are reversibility of the blocking effect, high heat (140° C.) and filtration stability, adjustment of rock surface wettability, self-adjusting viscosity in the course of injection and during filtration in reservoir conditions.

Shear gradient and dynamic viscosity values adjustable in wide ranges, along with the stability and surface activity of the ESN, ensure reliable blocking of most permeable zones and provide redistribution of filtration flows in the BFZ.

When the ESN is filtered in rock porous materials, the system effective viscosity depends on volumetric water content of a filtration channel and a filtration rate, increasing with an increase in the volumetric water content and a decrease in the filtration rate. This explains the self-adjustment of viscosity properties, velocity and direction of the ESN filtration into reservoir depth.

Well Selection and Requirements to a Target

Injection wells are selected for implementing the method. The basic requirements to wells are as follows:
a perforation interval and a well sump must be free from massive sediments, deposits and foreign objects that prevent liquids from filtering into the perforated intervals;
the casing string must be leaktight;
reservoir temperature is not limited, but must be determined before starting the works;
the well water injectivity must be at least 150 m³/day at an injection pressure at the wellhead not more than 120 atm; if injectivity is insufficient, the BFZ is treated according to one of the classical methods for increasing well injectivity.

An ESN volume to be injected is calculated according to the known method provided in the work by Orkney K. G., Kuchinsky P. K. "Calculations in technology and techniques of oil production", Gostoptekhizdat, 1959. To calculate a volume of the ESN required to fill a rock void space at a certain radius from the well, the following formula may be used:

$$V = \pi \cdot (R_{out}^2 - r_w^2) \cdot h \cdot m \cdot (1 - SWL - SOWCR)$$

where:
V—calculated volume, m³;
$R_{out}$—outer radius of the emulsion system fringe, m;
$r_w$—well radius, m;
h—reservoir thickness, m;
m—reservoir porosity factor, unit fraction;
SWL—connate water saturation, unit fraction;
SOWCR—residual oil saturation, unit fraction.

The provided method takes into account geometrical dimensions of the target area and porosity and permeability characteristics of the formation. The use of connate water saturation and residual oil saturation in the calculation enables to take into account the volume of the pore space that is not involved in the filtration process.

Technological Process of ESN Preparation

The ESN is prepared at an emulsion system preparation unit (ESPU) that comprises a process tank with a blade mixer installed therein and having a rotation speed of at least 90 rpm, and an external centrifugal pump for circulation of the ESN components. The necessary process equipment for preparation and injection of the ESN into production wells is shown in FIG. 1.

The process of preparing ESN with the use of an ESPU is a step-by-step process and includes the following steps:
feeding a calculated volume of diesel fuel or processed oil from an oil processing and pumping station (5-12 vol %) into the ESPU process tank;
starting the blade mixer and the centrifugal pump for circulation;
feeding a calculated volume of the emulsifier into the ESPU process tank (2-3 vol %);
feeding a calculated volume of colloidal nanoparticles of silicon dioxide (0.25-1.0 vol %) into the ESPU process tank;
feeding a calculated volume of an aqueous solution of calcium chloride or potassium chloride (the rest) into the ESPU process tank.

The components are introduced into the hydrocarbon base through an ejector with the use of a vacuum hose. The loading speed of the components is limited by the suction capacity of the ejector.

Technological tanks should be equipped with blade mixers providing constant and uniform distribution of reactants throughout the entire volume. To provide and maintain the required stability properties of the systems, it is recommended using reversible blade mixers.

The quality and stability of the properties of the prepared ESN depend on coverage of the entire volume of the ESPU process tank with the mixing, cleanliness of process tanks used, feeding rate of the components and dispersion time.

Quality control of ESN preparation is carried out by testing the sedimentation stability. The test is considered positive if, when a 200 ml ESN sample is kept at room temperature for 2 hours, not more than 2% of the ESN water component volume are separated.

The quantity and types of special machinery and equipment for performing well operations are shown in FIG. 1. The calculation was made on the condition that the ESN was prepared with the use of the ESPU. The presented list of special machinery and equipment is a basic one and may include additional items, depending on work conditions, a location of a mixing unit, process parameters and specific features of a well structure.

Preparatory Works on a Well

Before start of the works on injection of the ESN into a well, the following preparatory works are carried out on a well:
the well is stopped and discharged; serviceability of the stop valves at the wellhead equipment is checked;
circulation in the well is checked; and a decision is taken on a variant of injecting process liquids;
a value of the current formation pressure is determined;
the equipment for injecting the ESN is arranged according to an approved layout;

the equipment piping is provided; and the injection line is tested for a pressure value 1.5 times higher than the expected operating pressure, while observing applicable safety measures;

the injection line is provided with a non-return valve.

Injection Process

To maintain the continuity of the injection process, there must be a sufficient number of tank trucks at the well pad with the required volume of liquids for the operation.

The method is implemented by continuously injecting the estimated ESN volume into the injection well, while continuously monitoring the main parameters of the injection process. The ESN comprises diesel fuel or processed oil from an oil processing and pumping station, an emulsifier, colloidal nanoparticles of silicon dioxide, an aqueous solution of calcium chloride or potassium chloride.

The ESN may comprise (vol %): diesel fuel or processed oil from an oil processing and pumping station—5-12, an emulsifier—2-3, colloidal nanoparticles of silicon dioxide—0.25-1.0, an aqueous solution of calcium chloride or potassium chloride—the rest. The emulsifier may comprise (vol %): esters of higher unsaturated fatty acids and resin acids—40-42, amine oxide—0.7-1, high-molecular-weight organic thermostabilizer—0.5-1, diesel fuel—the rest. Colloidal nanoparticles of silicon dioxide may comprise (vol %):

silicon dioxide—30-32 in propylene glycol monomethyl ether—67-68, water—the rest, or silicon dioxide—29-31 in isopropanol—67-69 and methyl alcohol—the rest, or silicon dioxide—29-31 in ethylene glycol—the rest.

The main physical parameters of systems and aqueous solutions of salts are adjusted based on the calculated phase volumes of the components and their density.

One of the two options for injecting process liquids into the well can be used: direct or reverse. Traditionally, the process liquids are injected into the well tubing space (direct injection). However the preferred option for injecting the ESN is reverse injection through the tubular annular space.

The process liquids should be injected continuously, at a rate that prevents a decrease in the density of the process liquids.

The injection rate of the process liquids is determined by the magnitude of the reservoir pressure and should be maximum, exceeding the well productivity, provided that the well pressure does not exceed the maximum permissible value (according to the pressure test of the casing string).

A required density of the process liquids is determined on the basis of a calculation, while proceeding from the condition that a column of the process liquids creates a pressure that exceeds a current formation pressure by the safety factor.

An amount of dry potassium chloride or calcium chloride required to prepare the required volume of an aqueous solution of a certain density is calculated with the use of the following formula:

$$M_p = \frac{Y_p * `Y_{\text{жт}} - Y_B) * V_p * 10}{Y_p - Y_B},$$

where:
$M_p$—reactant amount, kg;
$Y_p$—reactant specific density, g/cm³;
$Y_{\text{жт}}$—specific density of killing process liquids, g/cm³;
$Y_B$—specific density of process water used for preparing process liquids, g/cm³;
$V_p$—required volume of aqueous solution, m³.

As final activities on the well, the following work must be performed:

1. Check that all valves on the well control equipment are closed.
2. Discharge the injection line, making sure that there is no excess pressure.
3. Dismantle the injection line avoiding spills of the process liquids.
4. Release the pressure to the atmospheric one in the pipeline from the well to the group metering unit.

Laboratory Studies of the ESN Physical Properties

To study the ESN physical properties, samples with different volumetric content of the components were prepared.

During the experiments, the following system parameters were determined:
density;
heat stability;
dynamic viscosity;
dynamic stability.

After the samples of the systems were prepared, they were kept for at least 2 hours at room temperature before starting the experiments.

Measuring ESN Density

Densities of the ESN samples were measured by the picnometric method (water component density was 1200 kg/m³). The results are shown in FIG. 2.

Measuring ESN Thermal Stability

Thermal stability was measured by keeping the ESN samples in graduated hermetically sealed cylinders in a heating cabinet for 8 hours; the temperature regime was set at 140° C. The test was considered positive if, after 8 hours of thermostating, not more than 2 vol. % of water were separated in the ESN from the total volume of the aqueous phase. In the result of the experiments, it was determined that all the samples were stable. The results are shown in FIG. 3.

Evaluating ESN Rheological Properties

The measurements of dynamic viscosity and dynamic stability of the ESN samples are shown in FIGS. 4 and 5. The measurements were obtained at the temperature of 20° C. (the temperature measurement error was ±0° C.) with the use of a REOTEST RV 2.1 rotational viscometer.

The following parameters were determined:
effective (apparent) viscosity (mPa.$) during direct and reverse measurements;
shear stress (Pa) during direct and reverse measurements;
dynamic stability.

Based on the results of the set of laboratory studies of the ESN physical properties, the basic technological properties of the developed systems were determined, which confirmed their high thermal stability and controlled rheology.

Examples of implementation of the method are given below.

Example 1

The following preparatory works were carried out on the well: the well was stopped, discharged, operability of the stop valves on the wellhead equipment was checked; a value of the current formation pressure was determined; the equipment was arranged according to the approved layout; piping of the equipment was carried out, and the injection line was tested for a pressure exceeding the expected operating pressure by 1.5 times; the injection line was provided with a non-return valve.

Upon completion of the preparatory work, a process of injecting the ESN into an injection well was started.

The ESN of the following composition, vol %, was injected in the volume of 426 m$^3$: diesel fuel—5, an emulsifier—2, colloidal nanoparticles of silicon dioxide—1.0, an aqueous solution of calcium chloride having the density of 1189 kg/m$^3$ —92.0. The emulsifier comprised, vol %: esters of higher unsaturated fatty acids (linoleic) and resin acids (dextropimaric)—40, amine oxide—0.7, a high-molecular-weight organic thermostabilizer (suspension of lime in diesel fuel)—0.5, diesel fuel—58.8. The colloidal nanoparticles of silicon dioxide comprised, vol %: silicon dioxide—30.0 in propylene glycol monomethyl ether—67.0, water—3.0.

According to the results of the well treatment, redistribution of filtration flows along the injectivity profile was achieved.

Example 2

In this and the following examples, the preparatory works were carried out in accordance with the procedure described in Example 1.

The ESN of the following composition, vol %, was injected in the volume of 502 m$^3$: diesel fuel—7, an emulsifier—2.5, colloidal nanoparticles of silicon dioxide—0.9, an aqueous solution of calcium chloride having the density of 1193 kg/m$^3$ —89.6. The emulsifier comprised, vol %: esters of higher unsaturated fatty acids (linoleic) and resin acids (dextropimaric)—41, amine oxide—0.8, a high-molecular-weight organic thermostabilizer (suspension of lime in diesel fuel)—0.7, diesel fuel—57.5. The colloidal nanoparticles of silicon dioxide comprised, vol %: silicon dioxide—32.0 in propylene glycol monomethyl ether—67.0, water—1.0.

According to the results of the well treatment, redistribution of filtration flows along the injectivity profile was achieved.

Example 3

The ESN of the following composition, vol %, was injected in the volume of 294 m$^3$: diesel fuel—10, an emulsifier—3, colloidal nanoparticles of silicon dioxide—0.6, an aqueous solution of calcium chloride having the density of 1187 kg/m$^3$ —86.4. The emulsifier comprised, vol %: esters of higher unsaturated fatty acids (linoleic) and resin acids (isodextropimaric)—42, amine oxide—1.0, a high-molecular-weight organic thermostabilizer (suspension of lime in diesel fuel)—1.0, diesel fuel—56.0. The colloidal nanoparticles of silicon dioxide comprised, vol %: silicon dioxide—32.0 in propylene glycol monomethyl ether—67.0, water—1.0.

According to the results of the well treatment, redistribution of filtration flows along the injectivity profile was achieved.

Example 4

The ESN of the following composition, vol %, was injected in the volume of 415 m$^3$: diesel fuel—12, an emulsifier—3, colloidal nanoparticles of silicon dioxide—0.5, an aqueous solution of calcium chloride having the density of 1205 kg/m$^3$ —84.5. The emulsifier comprised, vol %: esters of higher unsaturated fatty acids (linoleic) and resin acids (levopimaric)—42, amine oxide—1.0, a high-molecular-weight organic thermal stabilizer (suspension of lime in diesel fuel)—1.0, diesel fuel—56.0. The colloidal nanoparticles of silicon dioxide comprised, vol %: silicon dioxide—31.0 in propylene glycol monomethyl ether—68.0, water—1.0.

According to the results of the well treatment, redistribution of filtration flows along the injectivity profile was achieved.

Example 5

The ESN of the following composition, vol %, was injected in the volume of 433 m$^3$: diesel fuel—12, an emulsifier—3, colloidal nanoparticles of silicon dioxide—0.4, an aqueous solution of calcium chloride having the density of 1210 kg/m$^3$ —84.6. The emulsifier comprised, vol %: esters of higher unsaturated fatty acids (linoleic) and resin acids (palustric)—42, amine oxide—0.8, a high-molecular-weight organic thermostabilizer (suspension of bentonite in diesel fuel)—0.9, diesel fuel—56.3. The colloidal nanoparticles of silicon dioxide comprised, vol %: silicon dioxide—29.0 in isopropanol—69.0 and methyl alcohol—2.0.

According to the results of the well treatment, redistribution of filtration flows along the injectivity profile was achieved.

Example 6

The ESN of the following composition, vol %, was injected in the volume of 388 m$^3$: diesel fuel—11, an emulsifier—2.6, colloidal nanoparticles of silicon dioxide—0.25, an aqueous solution of calcium chloride having the density of 1215 kg/m$^3$ —86.15. The emulsifier comprised, vol %: esters of higher unsaturated fatty acids (oleic) and resin acids (neoabietic) —40, amine oxide—0.7, a high-molecular-weight organic thermostabilizer (suspension of bentonite in diesel fuel)—0.5, diesel fuel—58.8. The colloidal nanoparticles of silicon dioxide comprised, vol %: silicon dioxide—30.5 in isopropanol—67.5 and methyl alcohol—2.0.

According to the results of the well treatment, redistribution of filtration flows along the injectivity profile was achieved.

Example 7

The ESN of the following composition, vol %, was injected in the volume of 219 m$^3$: diesel fuel—9, an emulsifier—2.5, colloidal nanoparticles of silicon dioxide—1.0, an aqueous solution of calcium chloride having the density of 1205 kg/m$^3$ —87.5. The emulsifier comprised,% vol: esters of higher unsaturated fatty acids (oleic) and resin acids (neoabietic)—41, amine oxide—1.0, a high-molecular-weight organic thermostabilizer (suspension of bentonite in diesel fuel)—1.0, diesel fuel—57.0. The colloidal nanoparticles of silicon dioxide comprised, vol %: silicon dioxide—31.0 in isopropanol—68 and methyl alcohol—1.0.

According to the results of the well treatment, redistribution of filtration flows along the injectivity profile was achieved.

Example 8

The ESN of the following composition, vol %, was injected in the volume of 375 m³: diesel fuel—7, an emulsifier—2.0, colloidal nanoparticles of silicon dioxide—0.85, an aqueous solution of calcium chloride having the density of 1140 kg/m³—90.15. The emulsifier comprised, vol %: esters of higher unsaturated fatty acids (oleic) and resin acids (abietic)—40.5, amine oxide—0.8, a high-molecular-weight organic thermostabilizer (suspension of bentonite in diesel fuel)—0.6, diesel fuel—58.1. The colloidal nanoparticles of silicon dioxide comprised, vol %: silicon dioxide—31.0 in ethylene glycol—69.0.

According to the results of the well treatment, redistribution of filtration flows along the injectivity profile was achieved.

Example 9

The ESN of the following composition, vol %, was injected in the volume of 545 m³: processed oil from an oil processing and pumping station—7, an emulsifier—2.0, colloidal nanoparticles of silicon dioxide—0.85, an aqueous solution of potassium chloride having the density of 1153 kg/m³—90.15. The emulsifier comprised, vol %: esters of higher unsaturated fatty acids (oleic) and resin acids (dehydroabietic)—40.5, amine oxide—0.8, a high-molecular-weight organic thermostabilizer (suspension of bentonite in diesel fuel)—0.6, diesel fuel—58.1. The colloidal nanoparticles of silicon dioxide comprised, vol %: silicon dioxide—29.0 in isopropanol—69 and methyl alcohol—2.0.

According to the results of the well treatment, redistribution of filtration flows along the injectivity profile was achieved.

Example 10

The ESN of the following composition, vol %, was injected in the volume of 504 m³: processed oil from an oil processing and pumping station—9, an emulsifier—2.5, colloidal nanoparticles of silicon dioxide—0.5, an aqueous solution of potassium chloride having the density of 1150 kg/m³—88.0. The emulsifier comprised, vol %: esters of higher unsaturated fatty acids (oleic) and resin acids (dehydroabietic)—42.0, amine oxide—0.7, a high-molecular-weight organic thermostabilizer (suspension of bentonite in diesel fuel)—1.0, diesel fuel—56.3. The colloidal nanoparticles of silicon dioxide comprised, vol %: silicon dioxide—31.0 in isopropanol—67 and methyl alcohol—2.0.

According to the results of the well treatment, redistribution of filtration flows along the injectivity profile was achieved.

Example 11

The ESN of the following composition, vol %, was injected in the volume of 476 m³: processed oil from an oil processing and pumping station—10, an emulsifier—3.0, colloidal nanoparticles of silicon dioxide—1.0, an aqueous solution of potassium chloride having the density of 1147 kg/m³—86.0. The emulsifier comprised, vol %: esters of higher unsaturated fatty acids (oleic) and resin acids (dehydroabietic)—40.0, amine oxide—0.7, a high-molecular-weight organic thermostabilizer (suspension of bentonite in diesel fuel)—1.0, diesel fuel—58.3. The colloidal nanoparticles of silicon dioxide comprised, vol %: silicon dioxide—29.0 in ethylene glycol—71.0.

According to the results of the well treatment, redistribution of filtration flows along the injectivity profile was achieved.

Example 12

The ESN of the following composition, vol %, was injected in the volume of 352 m³: processed oil from an oil processing and pumping station—12, an emulsifier—3.0, colloidal nanoparticles of silicon dioxide—0.9, an aqueous solution of potassium chloride having the density of 1170 kg/m³—84.1. The emulsifier comprised, vol %: esters of higher unsaturated fatty acids (oleic) and resin acids (tetrahydroabietic)—41.0, amine oxide—0.9, a high-molecular-weight organic thermostabilizer (suspension of bentonite in diesel fuel)—0.8, diesel fuel—57.3. The colloidal nanoparticles of silicon dioxide comprised, vol %: silicon dioxide—30.0 in ethylene glycol—70.0.

According to the results of the well treatment, redistribution of filtration flows along the injectivity profile was achieved.

Example 13

The ESN of the following composition, vol %, was injected in the volume of 276 m³: processed oil from an oil processing and pumping station—10, an emulsifier—3.0, colloidal nanoparticles of silicon dioxide—0.25, an aqueous solution of potassium chloride having the density of 1200 kg/m³—86.75. The emulsifier comprised, vol %: esters of higher unsaturated fatty acids (oleic) and resin acids (tetrahydroabietic)—41.0, amine oxide—0.9, a high-molecular-weight organic thermostabilizer (suspension of bentonite in diesel fuel)—0.8, diesel fuel—57.3. The colloidal nanoparticles of silicon dioxide comprised, vol %: silicon dioxide—31.0 in ethylene glycol—69.0.

According to the results of the well treatment, redistribution of filtration flows along the injectivity profile was achieved.

Example 14

The ESN of the following composition, vol %, was injected in the volume of 275 m³: processed oil from an oil processing and pumping station—5.0, an emulsifier—2.0, colloidal nanoparticles of silicon dioxide—0.6, an aqueous solution of potassium chloride having the density of 1200 kg/m³—92.4. The emulsifier comprised, vol %: esters of higher unsaturated fatty acids (oleic) and resin acids (abietic)—42.0, amine oxide—1.0, a high-molecular-weight organic thermostabilizer (suspension of bentonite in diesel fuel)—1.0, diesel fuel—56.0. The colloidal nanoparticles of silicon dioxide comprised, vol %: silicon dioxide—31.0 in ethylene glycol—69.0.

According to the results of the well treatment, redistribution of filtration flows along the injectivity profile was achieved.

Example 15

The ESN of the following composition, vol %, was injected in the volume of 420 m³: processed oil from an oil processing and pumping station—6, an emulsifier—3.0, colloidal nanoparticles of silicon dioxide—0.6, an aqueous solution of potassium chloride having the density of 1205 kg/m³—90.4. The emulsifier comprised, vol %: esters of higher unsaturated fatty acids (oleic) and resin acids (levopimaric)—42.0, amine oxide—1.0, a high-molecular-weight organic thermostabilizer (suspension of bentonite in diesel fuel)—1.0, diesel fuel—56.0. The colloidal nanoparticles of silicon dioxide comprised, vol %: silicon dioxide—31.0 in ethylene glycol—69.0.

According to the results of the well treatment, redistribution of filtration flows along the injectivity profile was achieved.

Example 16

The ESN of the following composition, vol %, was injected in the volume of 350 m$^3$: processed oil from an oil processing and pumping station—5, an emulsifier—3.0, colloidal nanoparticles of silicon dioxide—1.0, an aqueous solution of potassium chloride having the density of 1190 kg/m$^3$ —91.0. The emulsifier comprised, vol %: esters of higher unsaturated fatty acids (oleic) and resin acids (palustric)—42.0, amine oxide—1.0, a high-molecular-weight organic thermostabilizer (suspension of bentonite in diesel fuel)—1.0, diesel fuel—56.0. The colloidal nanoparticles of silicon dioxide comprised, vol %: silicon dioxide—31.0 in propylene glycol monomethyl ether—67.0, water—2.0.

According to the results of the well treatment, redistribution of filtration flows along the injectivity profile was achieved.

Example 17

The ESN of the following composition, vol %, was injected in the volume of 388 m$^3$: processed oil from an oil processed and pumping station—12, an emulsifier—2.0, colloidal nanoparticles of silicon dioxide—0.25, an aqueous solution of potassium chloride having the density of 1195 kg/m$^3$ —85.75. The emulsifier comprised, vol %: esters of higher unsaturated fatty acids (oleic) and resin acids (palustric)—42.0, amine oxide—1.0, a high-molecular-weight organic thermostabilizer (suspension of bentonite in diesel fuel)—1.0, diesel fuel—56.0. The colloidal nanoparticles of silicon dioxide comprised, vol %: silicon dioxide—32.0 in propylene glycol monomethyl ether—67.0, water—1.0.

According to the results of the well treatment, redistribution of filtration flows along the injectivity profile was achieved.

Example 18

The ESN of the following composition, vol %, was injected in the volume of 276 m$^3$: processed oil from an oil processed and pumping station—9.0, an emulsifier—2.5, colloidal nanoparticles of silicon dioxide—0.7, an aqueous solution of potassium chloride having the density of 1205 kg/m$^3$ —87.8. The emulsifier comprised, vol %: esters of higher unsaturated fatty acids (oleic) and resin acids (dextropimaric)—41.0, amine oxide—0.7, a high-molecular-weight organic thermostabilizer (suspension of bentonite in diesel fuel)—0.5, diesel fuel—57.8. The colloidal nanoparticles of silicon dioxide comprised, vol %: silicon dioxide—32.0 in propylene glycol monomethyl ether—67.0, water—1.0.

According to the results of the well treatment, redistribution of filtration flows along the injectivity profile was achieved.

Example 19

The ESN of the following composition, vol %, was injected in the volume of 905 m$^3$: processed oil from an oil processing and pumping station—5.0, an emulsifier—3.0, colloidal nanoparticles of silicon dioxide—1.0, an aqueous solution of potassium chloride having the density of 1192 kg/m$^3$ —91.0. The emulsifier comprised, vol %: esters of higher unsaturated fatty acids (oleic) and resin acids (levopimaric)—41.0, amine oxide—0.7, a high-molecular-weight organic thermostabilizer (suspension of bentonite in diesel fuel)—0.5, diesel fuel—57.8. The colloidal nanoparticles of silicon dioxide comprised, vol %: silicon dioxide—30.0 in isopropanol—68 and methyl alcohol—2.0.

According to the results of the well treatment, redistribution of filtration flows along the injectivity profile was achieved.

Example 20

The ESN of the following composition, vol %, was injected in the volume of 290 m$^3$: processed oil from an oil processing and pumping station—8.0, an emulsifier—3.0, colloidal nanoparticles of silicon dioxide—0.7, an aqueous solution of potassium chloride having the density of 1203 kg/m$^3$ —88.3. The emulsifier comprised, vol %: esters of higher unsaturated fatty acids (oleic) and resin acids (levopimaric)—41.5, amine oxide—0.9, a high-molecular-weight organic thermostabilizer (suspension of lime in diesel fuel)—1.0, diesel fuel—56.6. The colloidal nanoparticles of silicon dioxide comprised, vol %: silicon dioxide—30.5 in isopropanol—67.5 and methyl alcohol—2.0.

According to the results of the well treatment, redistribution of filtration flows along the injectivity profile was achieved.

Thus, the present disclosure, and the various embodiments described herein, provides for redistribution of filtration flows at the BFZ of injection wells, increasing the formation coverage of treatment. At the same time, owing to the present disclosure, and the various embodiments described herein, the following is achieved:
- technological efficiency of well operation is increased,
- the composition applicability in oil-and-gas reservoirs is expanded due to increased mechanical and thermal stability of the emulsion system,
- implementation of the method in the conditions of an oil and gas production field is simplified due to a decrease in the composition components, due to eliminating the necessity of using a buffer pack for reducing the risk of gelation of a water absorbing polymer in the course of injecting the composition into a well, and due to reducing sensitivity of the agent components to salinity and composition of process water and formation waters,
- harmful effect on the environment is reduced due to reversibility of the blocking effect of the proposed composition.

The invention claimed is:

1. A method for leveling an injectivity profile of an injection well, comprising:
    injecting a blocking agent in a form of an emulsion system containing nanoparticles of silicon dioxide into a bottom hole formation zone; and
    redistributing filtration flows in the bottom hole formation zone to level the injectivity profile,
    wherein the emulsion system comprises:
        5-12 vol % diesel fuel,
        2-3 vol % an emulsifier,
        0.25-1.0 vol % colloidal nanoparticles of silicon dioxide, and the rest of the emulsion system being an aqueous solution of calcium chloride or potassium chloride, wherein:

the emulsifier is in the form of a composition comprising:
- 40-42 vol % esters of linoleic or oleic acids and resin acids,
- 0.7-1 vol % amine oxide,
- 0.5-1 vol % suspension of lime in diesel fuel or suspension of bentonite in diesel fuel,
- and the rest being diesel fuel, wherein the colloidal nanoparticles of silicon dioxide are in the form of a composition comprising:
- 30-32 vol % silicon dioxide in 67-68 vol % propylene glycol monomethyl ether and the rest being water, or
- 29-31 vol % silicon dioxide in 67-69 vol % isopropanol and the rest being methyl alcohol, or
- 29-31 vol % silicon dioxide in ethylene glycol, wherein ethylene glycol being the rest.

2. A blocking agent for injecting into a bottom hole formation zone in a form of an emulsion system containing nanoparticles of silicon dioxide, the emulsion system comprising:
- 5-12 vol % diesel fuel,
- 2-3 vol % an emulsifier,
- 0.25-0.9 vol % colloidal nanoparticles of silicon dioxide,
- and the rest of the emulsion system being an aqueous solution of calcium chloride or potassium chloride, wherein:

the emulsifier is in the form of a composition comprising:
- 40-42 vol % esters of linoleic or oleic acids and resin acids,
- 0.7-1 vol % amine oxide,
- 0.5-1 vol % suspension of lime in diesel fuel or suspension of bentonite in diesel fuel,
- and the rest being diesel fuel, wherein the colloidal nanoparticles of silicon dioxide are in the form of a composition comprisisng:
- 30-32 vol % silicon dioxide in 67-68 vol % propylene glycol monomethyl ether, and the rest being water, or
- 29-31 vol % silicon dioxide in 67-69 vol % isopropanol and the rest being methyl alcohol, or
- 29-31 vol % silicon dioxide in ethylene glycol, wherein ethylene glycol being the rest;

wherein the blocking agent redistributes filtration flows in the bottom hole formation zone, and wherein a shear gradient and a dynamic viscosity value of the emulsion system is adjustable depending upon a volumetric content of the water and a filtration rate.

3. The method according to claim 1, further comprising, prior to injecting the blocking agent into the bottom hole formation zone, determining:

a reservoir temperature, and that:
- a perforation interval and a well sump are free from sediments, deposits, and foreign objects that prevent liquid from filtering into the perforation interval;
- a casing string is leaktight; and
- a well water injectivity is at least 150 m$^3$/day at an injection pressure at a wellhead at not more than 120 atm.

4. The method according to claim 3, further comprising, if the well water injectivity is insufficient, treating the bottom hole formation zone to increase sufficiency of the well water injectivity.

5. The method according to claim 1, wherein injecting the blocking agent into the bottom hole formation zone uses a direct injection process.

6. The method according to claim 1, wherein injecting the blocking agent into the bottom hole formation zone uses a reverse injection process through a tubular annular space.

\* \* \* \* \*